July 12, 1955  N. A. HELDT  2,712,686
ADJUSTABLE TOOL CONSTRUCTION
Filed May 18, 1954
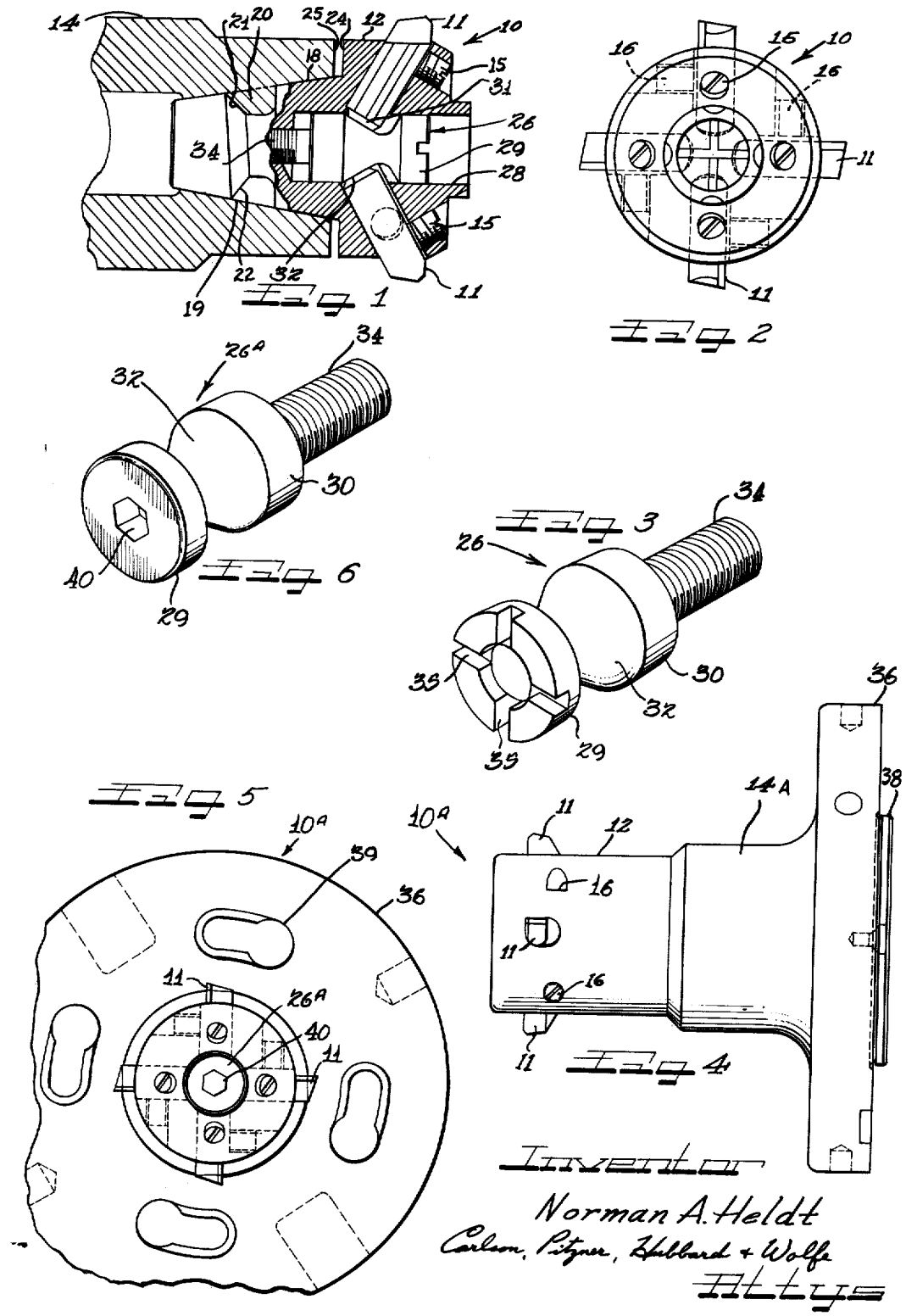
Inventor
Norman A. Heldt
Carlson, Pitzner, Hubbard + Wolfe
Attys

United States Patent Office 2,712,686
Patented July 12, 1955

2,712,686

ADJUSTABLE TOOL CONSTRUCTION

Norman A. Heldt, Allen Park, Mich., assignor to Ex-Cell-O Corporation, Detroit, Mich., a corporation of Michigan Application May 18, 1954, Serial No. 430,517

6 Claims. (Cl. 29—105)

The present invention relates in general to the field of cutting or boring tools and, more specifically, to a novel cutter head having one or more radially disposed tools adjustably mounted therein.

One object of the invention is to provide a cutter head of the character set forth and which will be susceptible of convenient, precise, and foolproof adjustment to machine work to desired tolerances with adequate compensation for wear or grinding.

Another object is to provide a cutter head of the foregoing type and which will be quickly attachable on, and detachable from, a machine spindle or other support to permit grinding and adjustment in the toolroom or at some other place removed from the machine without imparing the ability of the tool to hold its desired machining tolerances in the work.

A further object of the invention involves the provision of a cutter head of the type set forth and which will be simple and inexpensive to manufacture and yet susceptible of achieving positive, uniform adjustment of the cutting tool or tools.

Further objects and advantages of the invention will become apparent as the following description proceeds, taken in connection with the accompanying drawings, in which:

Figure 1 is a partial longitudinal sectional view taken axially of an illustrative cutter head embodying the invention.

Fig. 2 is an end view of the cutter head shown in Fig. 1.

Fig. 3 is an enlarged perspective view of the main adjusting element of the cutter head shown in Figs. 1 and 2.

Figs. 4 and 5 are, respectively, side and end elevational views of a slightly modified form of cutter head which also embodies the invention.

Fig. 6 is a view similar to Fig. 3 but showing a slightly modified form of adjusting element.

Although certain illustrative embodiments of the invention have been shown and described in some detail herein, it has not been intended to thereby limit the invention to the details of such embodiments. On the contrary, the invention contemplates all modifications, alternative embodiments, usages and equivalents of the cutter head which fall within the spirit and scope of the invention as expressed and defined in the specification and appended claims.

Referring more specifically to the drawing, the invention is shown in Figs. 1 and 2 embodied in an illustrative cutter head 10 carrying one or more cutting tools 11. In this instance, the cutter head utilizes four cutting tools 11 extending radially and obliquely from a cutter head body 12, the latter being mounted upon a spindle nose or other appropriate support 14 which may be one end of a power driven spindle or quill on an associated boring machine. The cutting tools 11 in this case are of substantially circular cross section and are housed within circular bores which angle uniformly toward the center of the body 12. The tools 11 are fixed in place within their associated bores by means of a series of set screws 15 accessible from the end of the cutter body and another series of set screws 16 accessible from the outer periphery of the cutter body.

Provision is made in the cutter head 10 for permitting quick and repeated detachment of the same from the support 14 for grinding or adjustment in the toolroom or at some other location away from the machine, and at the same time permitting quick and repeated attachment of the head 10 on the support after grinding or adjustment of the cutting tools, all without impairing the ability of the cutter head to hold close machining tolerances in the work. As shown in Fig. 1, the body in this case is formed with a tapered shank 18 which fits a similarly tapered bore 19 in the support 14. To retain the shank 18 in place within the bore 19, resort may be had to a bayonet lock arrangement. Accordingly, the tapered bore 19 may be provided with a radial projection 20 having a tapered rear face 21. By the same token, the shank 18 may have a longitudinal slot (not shown) of suitable width and depth to accommodate the projection 20 and permit insertion of the shank 18 into the bore 19 without obstruction. The shank 18 is also formed with a relatively wide and deep peripheral groove having a helical surface 22 adapted to cam against the tapered face 21 of the projection 20 upon turning of the cutter head body 12 after insertion of the shank 18 into the bore 19. The parts may be so proportioned that a slight gap is left between the opposed shoulders 24, 25 situated respectively on the body 12 and the support 14. However, the interfitting parts may be proportioned so that the shoulders 24, 25 abut each other when the cutter head 10 is mounted in operative position on the support 14.

In order to effect precise, uniform and foolproof radial adjustment of the cutting tools 11, the cutter head 10 is equipped with an adjusting element 26 which is capable of resisting any unbalanced tool thrusts and susceptible of operating satisfactorily without interference from chips or other foreign matter. This is accomplished by making the element 26 somewhat spool-shaped and housing the same within a central axial bore 28 in the body 12, appropriate provision being made for selectively moving and positioning the element 26 axially of the bore 28.

Accordingly, the adjusting element 26 is formed with a pair of axially spaced support flanges or journals 29, 30 connected by a necked-down section 31 (Figs. 1, 3 and 6). The section 31 defines on its outer periphery a substantially conical cam surface 32 tapering axially of the element 26. The surface 32 is of appropriate angularity to snugly and abuttingly engage the inner ends of the cutting tools 11. Moreover, such engagement occurs in a closed chamber which is completely isolated from the exterior of the head 10 and thus protected against the entry of chips or other foreign material which might interfere with precise adjustment. The adjusting element 26 may be moved axially of the bore 28 in various ways and, in the present instance, this is accomplished by means of a screw thread connection. As indicated in the drawings, the inner end of the member 26 has a threaded shank 34 which engages a tapped axial hole in the tapered shank 18. The outer end of the support journal 29 may be fashioned with a suitable tool-engaging means such as screw driver slots 35 to permit the application of an adjusting torque to the element 26.

The cutter head 10 may readily be removed from the machine and set up on an appropriate support in the toolroom for grinding and subsequent adjustment. To effect such adjustment, it is only necessary for the operator to loosen the set screws 15, 16 for each cutter tool until they permit sliding movement of the tool 11 in its bore but still exert substantial frictional drag against such movement. A screw driver or adjusting wrench is then inserted in the outer end portion of the adjusting element 26 and turned in the proper direction to shift the same axially to the right (as viewed in Fig. 1). This resulting axial movement of the element 26 cams the cutting tools 11 radially outward and such movement is permitted to continue until the tools are in their desired position of adjustment. At this point, the set screws 15, 16 are once more tightened, retaining the tools 11 in their newly adjusted position. Because the cam surface 31 is working against a fixed load impressed upon it by the drag of the set screws, there is no lost motion in the adjustment and the element 26 and the tools 11 remain under a certain amount of compression stress, thus eliminating any tendency to vibrate during operation of the cutter head 10. When the adjustment has been completed, the cutter head may then be quickly remounted in its associated machine tool without impairment of machining accuracy.

Turning now to Figs. 4, 5 and 6, there is shown a slightly modified form of cutter head 10A which also embodies the invention. Since the adjusting arrangement and cutting tool mounting of the cutter head 10A is substantially identical with that of the cutter head 10, a detailed description of the identical features of the cutter head 10A is not considered necessary at this point and certain identical parts will be designated by like reference numerals.

The cutter head 10A differs from the cutter head 10 primarily in that the head 10A is provided with a detachable mount in the form of a hub 14A and a mounting flange 36, these parts in the present case being integral with the cutter head body 12. The face of the flange 36 remote from the head 10A is formed with a hub or pilot 38 for precisely centering the head 10A on the face plate flange of a driving spindle or quill (not shown) to facilitate quick attachment and detachment of the head 10A relative to an associated face plate support. The flange 36 may be fashioned with a series of circumferentially spaced keyhole slots 39 adapted to coact with correspondingly located mounting bolts on the face plate support.

The cutter head 10A may utilize an adjusting element identical with the element 26, shown in Fig. 3. By the same token, the head 10A may utilize the slightly modified adjusting element 26A shown in Fig. 6. The element 26A is similar in all material respects to the element 26 but is provided with a tool-engaging socket or recess 40 in lieu of the slots 35 of the element 26.

It will be appreciated that the cutter heads 10, 10A may be set up to operate with a plurality of cutting tools 11 or, alternatively, with just a single tool 11. When a plurality of tools 11 are used, it is advantageous to set them in the body 12 in diametrically opposed pairs so as to substantially balance out thrusts running longitudinally of the tools. When a single tool is used, however, the spool-shaped construction of the adjusting element 26 is well adapted to resist a longitudinal tool thrust without distortion and loss of accuracy.

I claim as my invention:

1. An adjustable cutter head comprising the combination of a body having an axial bore therein and a plurality of generally radial bores communicating with the axial bore, a corresponding plurality of cutting tools in said radial bores, frictional means for opposing movement of said cutting tools longitudinally of said radial bores, an adjusting element telescopically mounted within said axial bore and connected with said body for adjustment longitudinally thereof, axially spaced support journals on said adjusting element, and a tapered cam on said adjusting element interposed between said support journals and adapted to bear against the inner ends of said tools for uniformly adjusting the same radially of said body.

2. An adjustable cutter head comprising, in combination, a body having an axial bore therein and a plurality of generally radial bores communicating with the axial bore, means on said body for effecting quick and repeated detachment and attachment of said head with respect to a machine spindle or the like, a plurality of cutting tools in said generally radial bores, frictional means for opposing movement of said cutting tools longitudinally of said radial bores, an adjusting element telescopically mounted within said axial bore and connected with said body for adjustment longitudinally thereof, axially spaced support journals on said adjusting element, and a tapered cam on said adjusting element interposed between said support journals and adapted to bear against the inner ends of said tools for effecting uniform adjustment of the same radially of said body.

3. An adjustable cutter head comprising, in combination, a body having an axial bore therein and a generally radial bore communicating with the axial bore, a cutting tool in said generally radial bore, frictional means for opposing movement of said cutting tool longitudinally of said radial bore, an adjusting element slidably housed within said axial bore of said body, axially spaced support journals on said adjusting element, and a necked-down portion situated on said adjusting element and adapted to cam against the inner ends of said cutting tool for adjusting the same radially of said body.

4. An adjustable cutter head comprising, in combination, a body having an axial bore therein and at least one generally radial bore communicating with the axial bore, means on said body for effecting quick and repeated mounting and dismounting of said head with respect to a machine spindle or the like, a cutting tool in each said radial bore, frictional means for opposing movement of said cutting tool longitudinally of said radial bore, an adjusting element housed within said axial bore of said body and threadedly connected therewith, axially spaced support journals on said adjusting element, and a necked-down portion situated on said adjusting element and adapted to cam against the inner end of each said cutting tool for adjusting the same.

5. In a cutter head of the character set forth and having one or more generally radially disposed cutting tools, an adjusting element for said cutting tools, comprising, in combination, a threaded shank, a first support flange fixed to said threaded shank, a second support flange disposed in axially spaced relation with said first support flange, a necked-down section interposed between and connecting said support flanges, said necked-down section having a tapered adjusting surface thereon, and tool-engaging means on said adjusting element.

6. In a cutter head of the character set forth and having one or more generally radially disposed cutting tools, a spool-shaped adjusting element for said cutting tools and comprising, in combination, a threaded shank, a first support journal fixed to said threaded shank, a second support journal disposed in axially spaced relation with said first support journal, a necked-down section interposed between and connecting said support journals, said necked-down section having a substantially conical adjusting surface thereon, and tool-engaging means on said second support journal for transmitting an adjusting torque to said adjusting element.

References Cited in the file of this patent

UNITED STATES PATENTS

| | | |
|---|---|---|
| 1,281,519 | Clark | Oct. 15, 1918 |
| 1,516,172 | Berg | Nov. 18, 1924 |
| 1,571,339 | Madden | Feb. 2, 1926 |
| 1,927,409 | Markstrum | Sept. 19, 1933 |
| 2,517,668 | Howald | Aug. 8, 1950 |

Disclaimer 2,712,686.—*Norman A. Heldt*, Allen Park, Mich. ADJUSTABLE TOOL CONSTRUCTION. Patent dated July 12, 1955. Disclaimer filed Dec. 19, 1957, by the assignee, *Ex-Cell-O Corporation*.

Hereby enters this disclaimer to claims 1, 3, 5, and 6 of said patent.

[*Official Gazette January 28, 1958.*]